United States Patent
Daims

(10) Patent No.: US 11,225,255 B1
(45) Date of Patent: Jan. 18, 2022

(54) BRAKING AND STEERING SUB-SYSTEM FOR A MOTOR VEHICLE

(71) Applicant: Kurt Daims, Brattleboro, VT (US)

(72) Inventor: Kurt Daims, Brattleboro, VT (US)

(*) Notice: Subject to any disclaimer, the term of this patent is extended or adjusted under 35 U.S.C. 154(b) by 250 days.

(21) Appl. No.: 16/278,456

(22) Filed: Feb. 18, 2019

(51) Int. Cl.
| | |
|---|---|
| *B60K 6/00* | (2006.01) |
| *B60W 20/00* | (2016.01) |
| *B60W 10/02* | (2006.01) |
| *B60W 30/18* | (2012.01) |
| *B60W 10/06* | (2006.01) |
| *B62D 5/06* | (2006.01) |
| *B60T 13/46* | (2006.01) |
| *B60K 17/02* | (2006.01) |
| *F02B 67/06* | (2006.01) |
| *B60W 10/30* | (2006.01) |
| *H02P 29/00* | (2016.01) |

(52) U.S. Cl.
CPC ....... *B60W 30/18072* (2013.01); *B60K 17/02* (2013.01); *B60T 13/46* (2013.01); *B60W 10/02* (2013.01); *B60W 10/06* (2013.01); *B60W 10/30* (2013.01); *B62D 5/063* (2013.01); *B62D 5/064* (2013.01); *F02B 67/06* (2013.01); *H02P 29/0027* (2013.01); *B60W 2030/1809* (2013.01); *B60W 2510/0647* (2013.01); *B60W 2510/104* (2013.01); *B60W 2510/106* (2013.01); *B60W 2520/10* (2013.01); *B60W 2710/021* (2013.01); *B60W 2710/30* (2013.01)

(58) Field of Classification Search
CPC ...... B60W 10/02; B60W 10/06; B60W 10/30; B60W 10/18; B60W 10/188; B60W 10/20; B60W 10/08; B60W 20/40; B60W 30/18127; B60W 30/18018; B60W 30/18054; B60W 30/18072; B60W 30/1886; B60W 30/188; B60W 30/192; B60W 2030/1809; B60W 2510/0642; B60W 2510/0647; B60W 2510/0638; B60W 2510/0666; B60W 2510/242; B60W 2710/065; B60W 2710/0655; B60W 20/14; F16H 61/0031; F16H 61/0028; F16H 57/0441; F16H 57/0439; B60T 13/46
See application file for complete search history.

(56) References Cited

U.S. PATENT DOCUMENTS

| | | | |
|---|---|---|---|
| 6,845,832 B2 * | 1/2005 | Takizawa | F02N 15/046 180/53.8 |
| 10,207,710 B1 * | 2/2019 | Daims | B60W 10/30 |
| 2003/0116368 A1 * | 6/2003 | Winkelman | B60K 6/383 180/65.25 |

* cited by examiner

*Primary Examiner* — Charles A Fox
*Assistant Examiner* — Ryan P Dodd
(74) *Attorney, Agent, or Firm* — C. Nessler

(57) ABSTRACT

Apparatus for providing hydraulic line pressure and vacuum respectively to the steering subsystem and the braking subsystem of a wheeled motor vehicle comprises a battery powered electric motor which drives one or more of a hydraulic pump and a vacuum pump. When the engine is stopped while the vehicle is moving, to save fuel, the electric motor drives the pumps, so that hydraulic pressure and vacuum are provided for continued safe operation of the vehicle.

11 Claims, 5 Drawing Sheets

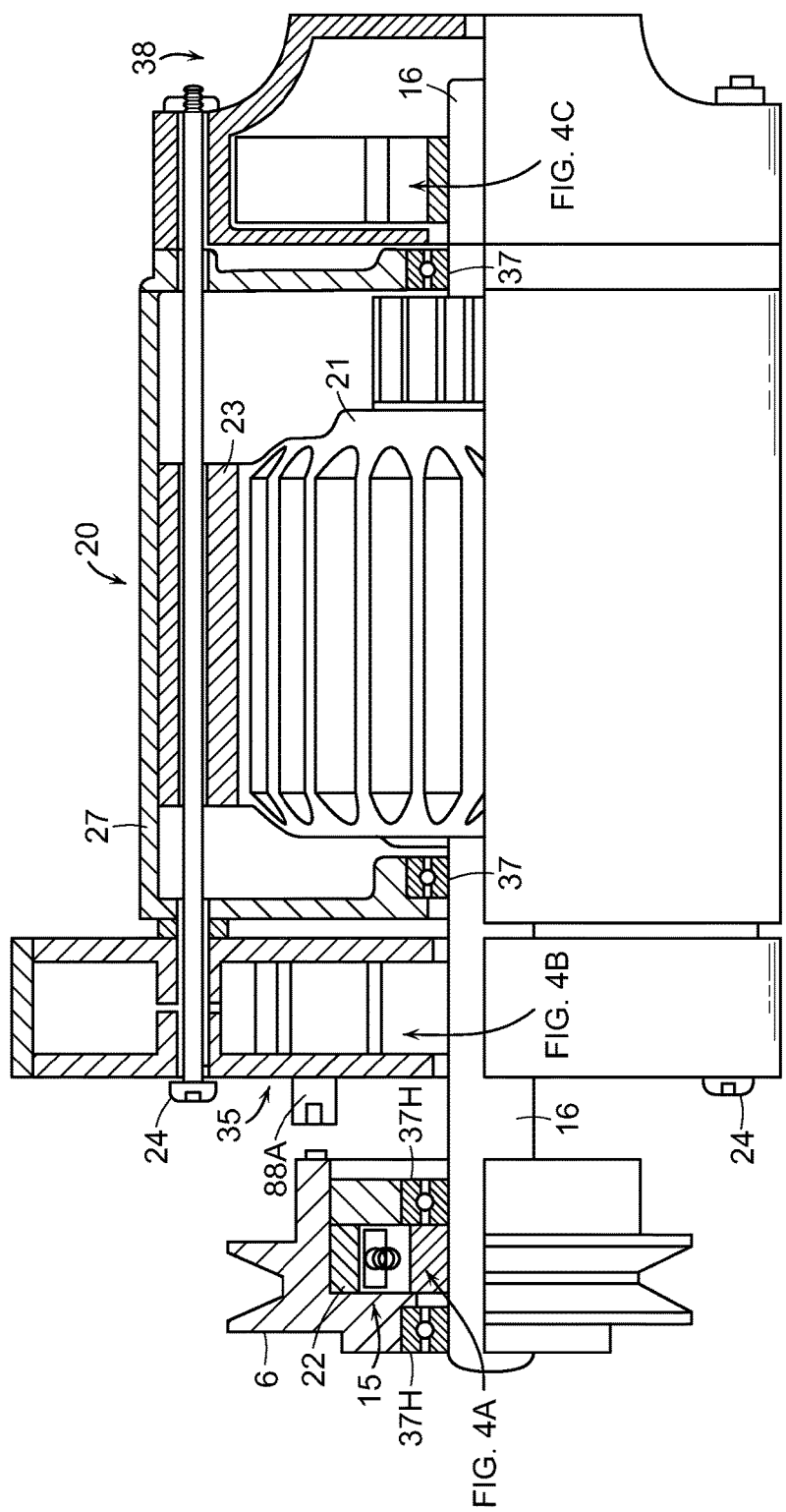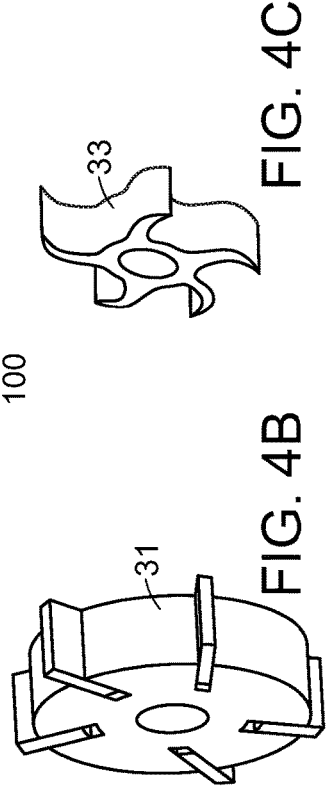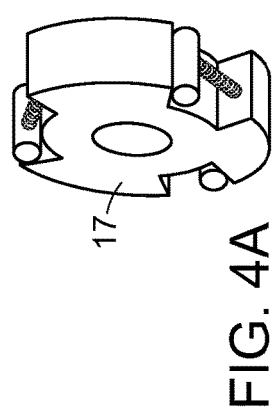

BRAKING AND STEERING SUB-SYSTEM FOR A MOTOR VEHICLE

This application is a continuation of patent application Ser. No. 14/750,777 filed Jun. 25, 2015, now U.S. Pat. No. 10,207,710.

TECHNICAL FIELD

The invention described relates to the field of wheeled motor vehicles which are powered by internal combustion engines and which have either or both hydraulic and vacuum actuated subsystems.

BACKGROUND

Fuel economy and safety are of high interest in connection with motor-vehicles. In many familiar motor vehicles an internal combustion engine is the prime mover for powering a drivetrain that extends to the wheels, thereby to move the vehicle across a surface such as a road. In addition to moving the vehicle, the engine is often used to power equipment such as power-assisted steering and vacuum-assisted power brakes. Some vehicles have an air compressor which is driven by the engine, to provide compressed air for operation of components such as brakes.

Pressurized hydraulic fluid aids the operator in movement of a steering wheel, for directing the vehicle. If hydraulic power is suddenly absent, turning the vehicle's steering wheel can be dangerously difficult.

Vacuum to power a brake booster is commonly obtained by connection to the sub-atmospheric pressure region within the intake manifold of the internal combustion engine. Sometimes there is a supplementary engine driven vacuum pump. If the engine is stopped, with the result that the vacuum source is absent, the vehicle's braking action can be dangerously reduced.

Some motor vehicle operators are known to save fuel by turning off or idling the vehicle's engine, and coasting the vehicle. However, any resultant reduction in powering of the steering and brake systems can be unsafe. Thus, when a motor vehicle of the type of current interest is coasting, the engine must be kept running at speed sufficient to provide the means for powering brakes and steering, unless there is some sort of hydraulic/pneumatic storage system such as an accumulator or bulky storage tank. Keeping the engine running during conditions when the drivetrain does not require power might be considered an unnecessary expenditure of fuel if there were means other than the engine for ensuring steering and braking safety.

Apparent prior art solutions to the problem of engine failure and resultant inadequate hydraulic system pressure are disclosed in the patent literature, in connection with steering systems on construction and agricultural equipment. Those solutions include providing a hydraulic pump which is powered by contact with the ground (and thus by movement of the vehicle) or a hydraulic pump which is powered by an electric motor. The prior art pumps are said to manually or automatically come on when the primary hydraulic system becomes inoperative because of failure of the hydraulic system or of the engine. See U.S. Pat. No. 3,153,462 of Peller, U.S. Pat. No. 3,940,931 of Renfro et al., U.S. Pat. No. 5,201,174 to Barber et al., U.S. Pat. No. 4,942,935 of Lech, and U.S. Pat. No. 5,564,516 of Nimblett Jr. et al. Deficiencies or limitations in the prior art include that certain prior art inventions are not suited for retrofit, or are only usable momentarily in emergency situations.

There is a need for improvements in internal combustion motor vehicle systems to maintain safety while enabling energy savings. Any improvement should be simple, inexpensive, and preferably appropriate both as original equipment and retrofit on vehicles already in use.

SUMMARY

An object of the invention is to provide an apparatus for use on an internal combustion engine powered motor vehicle which enables the engine to be turned off without depriving the vehicle of vacuum and hydraulic subsystems capacities, sufficient for braking and steering. Another object of the invention is to provide a means and method for saving fuel while a motor vehicle is moving, without a reduction of steering and braking action. A further object of the invention is to provide a system of the foregoing type which is both suitable for inclusion in new vehicles and simple enough to be retrofitted on previously manufactured motor vehicles.

In an embodiment of the invention, apparatus for use on a motor vehicle having an internal combustion engine and hydraulic and vacuum powered subsystems for steering and braking comprises an electric motor having a main shaft driven through an over-running (one-way rotation) clutch by a power rotary output shaft of the engine or by a pulley engaged with an endless belt driven by the engine. A hydraulic pump and a vacuum pump are mounted on or driven by the main shaft of the electric motor. Preferably, the impeller of each pump is mounted on the shaft. When the engine of the vehicle is running, power transmitted by the rotary output shaft or by the belt and pulley to the main shaft of the apparatus runs the pumps. When the engine is not running and the vehicle is moving, a power supply such as a battery energizes the motor which rotates the main shaft and runs the pumps. The over-running clutch enables that by allowing the main shaft to rotate at a higher speed than the pulley.

In an embodiment of the invention, while the vehicle is moving across a surface such as a roadway, the engine of the vehicle may be turned off (which includes putting the engine in a state of such low rotation that the outputs of the pumps are insufficient to power the vehicle subsystems); and the electric motor is turned on manually or automatically to power the hydraulic and/or vacuum pumps. When the engine is turned off, the engine also may be disengaged from the drive train that connects the engine to the wheels of the vehicle. Thus, fuel is saved by not running the engine; and, at the same time the brake and steering subsystems remain functional.

In embodiments of the invention, there may be an automatic controller that acts on the engine, transmission and motor. The controller receives signals from one or more sensors that indicate vehicle speed, engine speed, or the amount of power transmitted by the transmission.

The invention increases fuel economy in a motor vehicle by allowing the engine to be turned off and disengaged from the drivetrain when engine power is not required for moving the vehicle, but avoids a compromising of safety, since the invention system provides power to essential equipment such as power steering and power brakes.

The foregoing and other objects, features and advantages of the present invention will become more apparent from the following description of preferred embodiments and accompanying drawings.

BRIEF DESCRIPTION OF THE DRAWINGS

FIG. 4 is a partial lengthwise cross section of portions of an ISM subsystem of the present invention.

FIG. 4A is perspective view of the inner driven portions of the overrunning clutch of the pulley part of the apparatus shown in FIG. 4.

FIG. 4B is perspective view of the inner impeller portion of the hydraulic pump of the apparatus shown in FIG. 4.

FIG. 4C is perspective view of the inner impeller portion of the vacuum pump of the apparatus shown in FIG. 4.

DESCRIPTION

In the present description, an exemplary motor vehicle is a self-powered device, typically having four wheels, some or all of which may be powered to move the vehicle across a surface, some or all of which may be braked to stop the vehicle, and, some or all of which may be rotated about a substantially vertical axis to steer the vehicle. A motor vehicle that may be used in and with the present invention has an internal combustion engine running on fuel and having one or more rotary output shafts. The motor vehicle has a drivetrain which comprises the components which carry the engine power to the wheels of the vehicle. A drivetrain commonly includes a, the output end of which typically connects to a drive shaft, which runs to a differential, which turns axles that run to opposing side drive wheels of the vehicle. The transmission may be manual or automatic and may comprise a fluid coupling.

Embodiments of the present invention are described mostly in terms of a motor vehicle system which comprises certain subsystems, namely at least a hydraulic power-augmented steering subsystem (often referred to in short as "power steering") and a vacuum power-augmented brake subsystem (often referred to in short as "power brakes"), which operate respectively by means of hydraulic fluid pressure and by means of vacuum or suction. Typically, in absence of the invention, hydraulic fluid flow for the steering system is provided by a hydraulic pump that is driven by the engine, and the vacuum source is the sub-atmospheric pressure region that is created within the intake manifold of the engine—sometimes aided by an in-line vacuum pump powered by the engine. It will be understood that the present invention as described hereafter could comprise a motor vehicle which has one or more components which operate by means of compressed air, which compressed air, in the absence of the invention, would usually be supplied by an air pump (compressor). Generally, the foregoing kinds of components which are designed for pressurizing liquid or air, or for drawing air away, may be called fluid movers.

Figure 1:
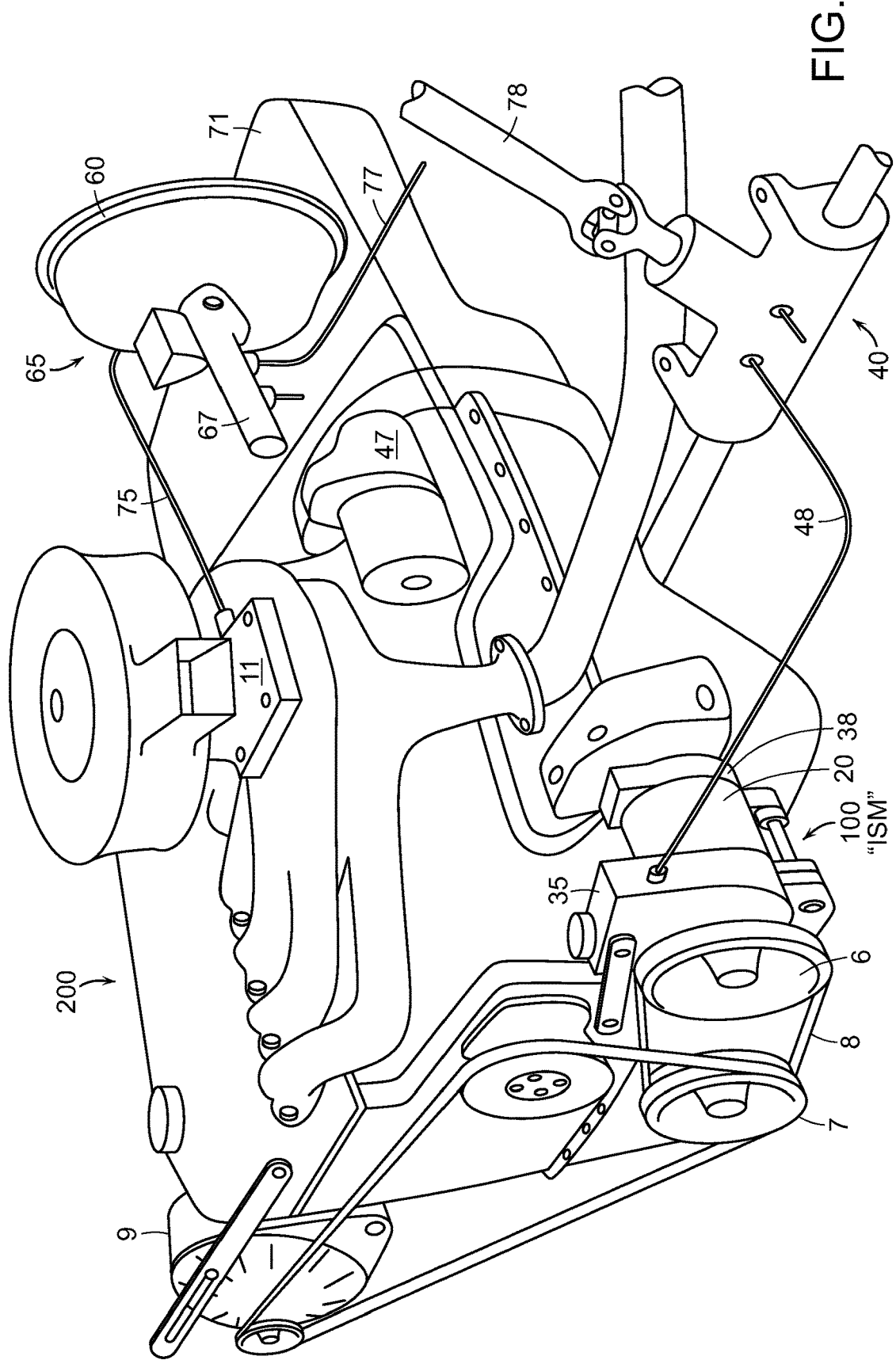
FIG. 1 is a perspective view of an exemplary system comprising a motor vehicle engine, transmission, and other components, along with some apparatus of the present invention (called ISM), which is mounted on the engine for powering the brake and steering actuators.

FIG. 1 is a simplified perspective view of selected motor vehicle components, showing an internal combustion engine 200 having a transmission 71 which is a portion of a drivetrain 300 (described below). The vehicle components also comprise a hydraulic brake master cylinder assembly 67 with associated booster 60, and a steering actuator 40 that has integral parts that, through hydraulics, increase the effect of turning of the vehicle steering wheel shaft 78 by an operator/driver. Engine 200 is fitted with a subsystem 100 that comprises an embodiment of the present invention. The subsystem 100 is termed an "ISM" and is described more particularly below. While the ISM subsystem 100 is described in combination with a wheeled motor vehicle having an internal combustion engine, an ISM subsystem may exist as a separate element.

In use of embodiments of the present invention, the engine of the motor vehicle is turned off, or stopped, to decrease consumption of fuel. In such condition, the engine will cease to generate pressure (positive or negative, as applies) in the hydraulic lines and vacuum lines, which pressure is sufficient for steering and braking purposes. In some alternative practices of the invention, the engine may be made to rotate at a very low speed—a speed which is termed "sub-idle speed," to conserve fuel, and by definition here, in such condition the engine speed will be insufficient to provide adequate hydraulic and vacuum pressure/flow for functioning of the power steering and power brakes, and the engine speed may be insufficient to provide meaningful motive power to the vehicle drive train, as well. For purposes of this description and the claims, such sub-idle low speed engine condition shall be equivalent to the engine being off or stopped.

When the engine is stopped while the vehicle is moving, the vehicle is said herein to be coasting. The engine may also be stopped when the vehicle is not moving, for instance, when the vehicle is in a traffic jam. When the vehicle is either coasting or stopped and the engine is off, the vehicle is characterized herein as being in rest mode. When the vehicle is in rest mode, in carrying out the invention, the transfer of engine power through the transmission is desirably stopped. That may be accomplished by disconnecting the drive train from the engine (as by a clutch mechanism) or by placing the transmission in "neutral" (as by disengaging an internal coupling or gear train). When the drive train comprises a fluid coupling associated with the transmission, then a sufficiently low engine speed is tantamount to disconnection of the engine from the wheels. In any of the foregoing cases, when the transmission is not transmitting motive power to the rest of the drive train and the wheels to provide significant force that propels the vehicle, the transmission is considered herein to be disengaged. For simplicity hereafter and with respect to the claims, a clutch and or a fluid coupling associated with a transmission shall be considered to be part of the transmission.

Figure 2:
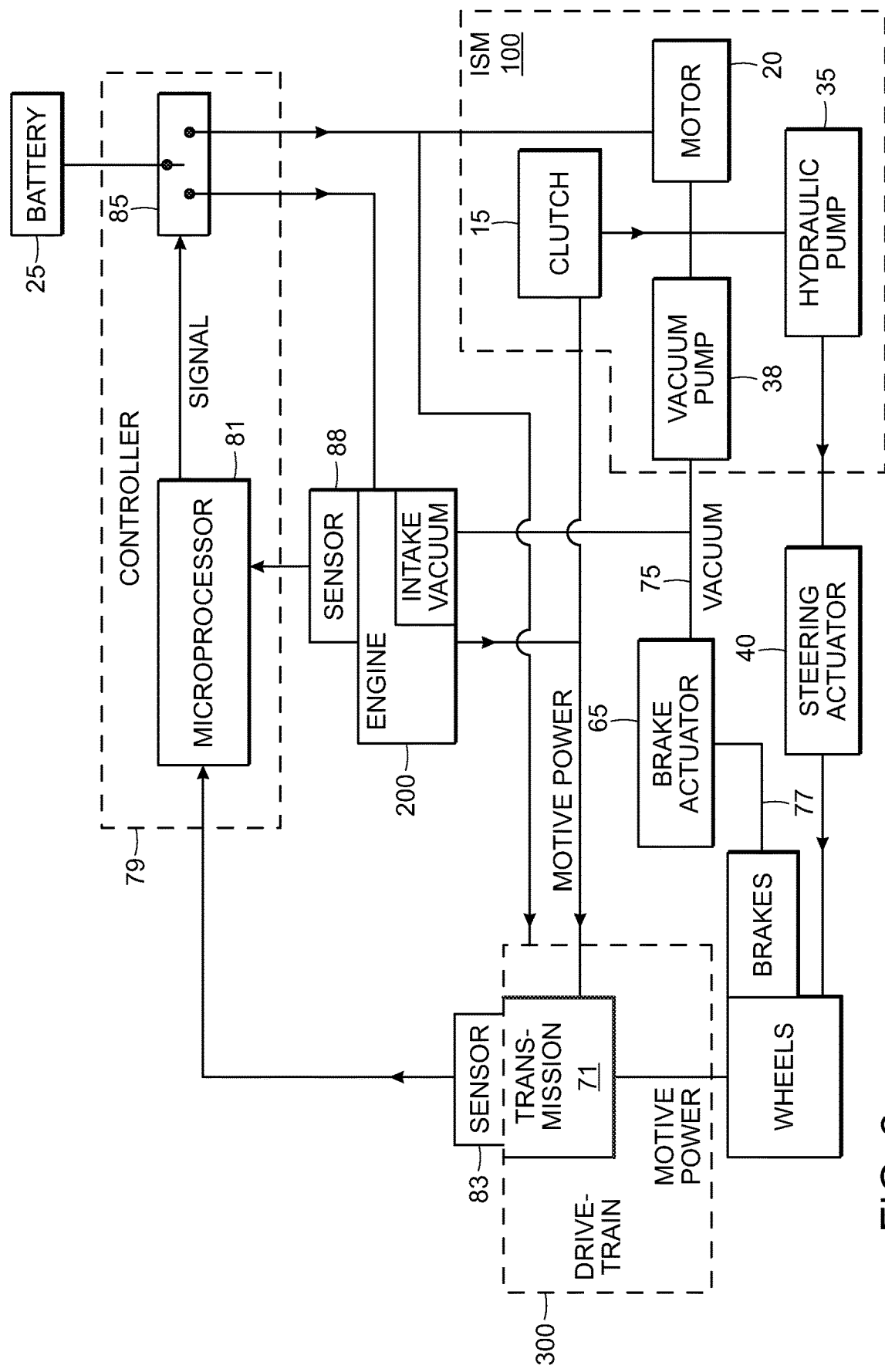
FIG. 2 is a block diagram of an exemplary motor vehicle system that includes optional automatic control.
Figure 3:
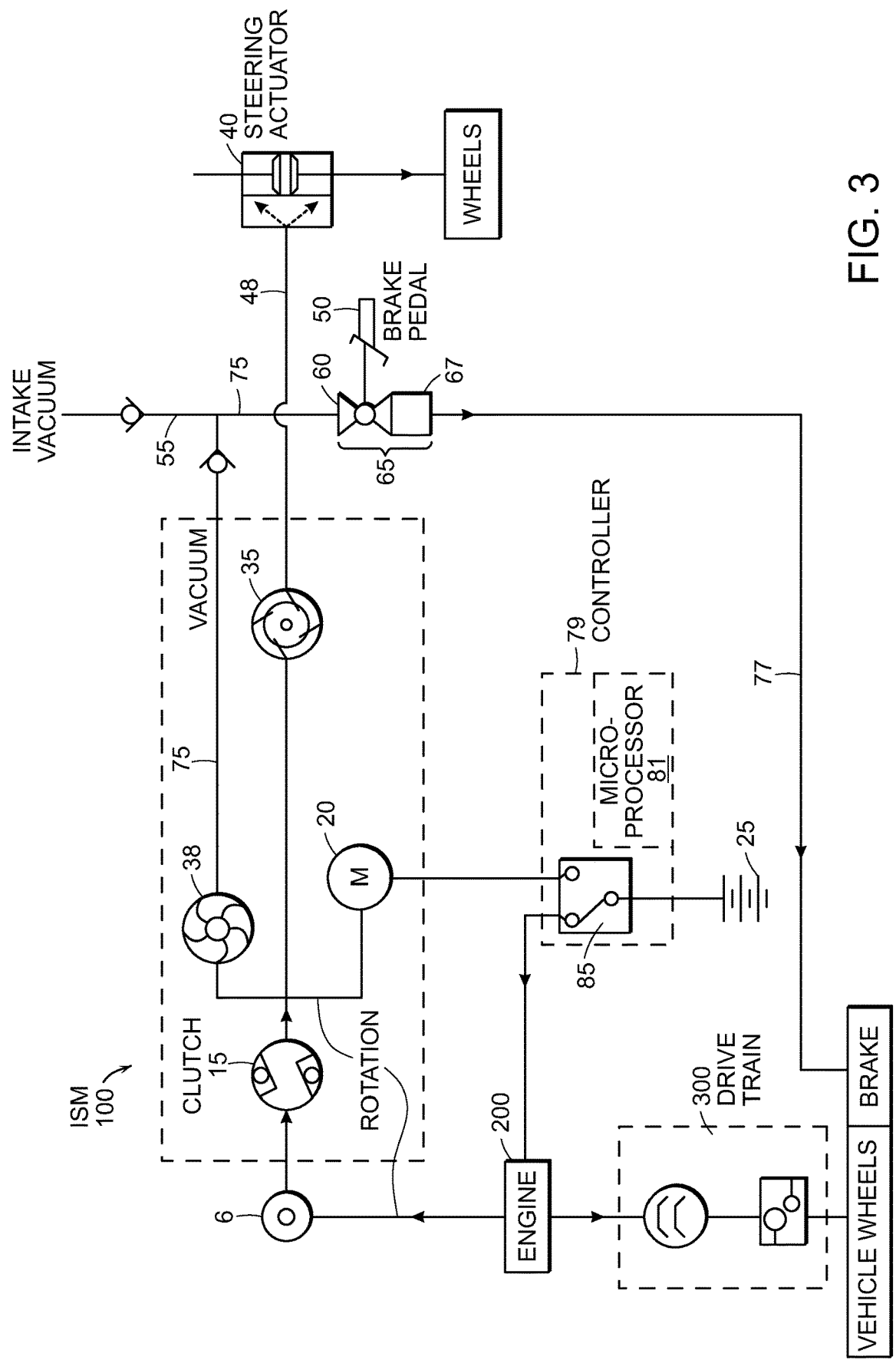
FIG. 3 is a schematic a diagram of an exemplary motor vehicle system that may be controlled manually.

FIG. 2 is a block diagram of an embodiment of the present invention; and the diagram includes parts of the motor vehicle. FIG. 3 is a schematic diagram of the same, with some variation. For purposes of clarity of illustration, certain components that are familiar to motor vehicle artisans are omitted, including such as relays, cut-outs, ignition system, fuel valves, etc.

FIG. 4 shows in partial cross section an embodiment of ISM subsystem 100 comprising a direct current electric motor 20. Motor 20 comprises armature (also called a rotor) 21 and stator (typically permanent magnets or electromagnets) 23, which is affixed to the motor housing. The armature is secured on main shaft 16, which is the shaft of the motor/ISM. Through electromagnetic force relative to the stator, armature 21 rotates main shaft 16 when current flows through the characteristic electric windings of the armature.

Referring also to FIG. 1, and the other Figures, the major mechanical components of preferred embodiment ISM 100 comprise a pulley 6 which is driven by endless belt 8 (typically a v-belt or serpentine belt). Belt 8 is driven by engine pulley 7 which rotates when the engine is running (i.e., when the engine is not stopped, as described above). Engine pulley 7 rotates as a direct or indirect result of rotation of a shaft of the engine, typically the crankshaft. Also shown in FIG. 1 for reference are electric generator 9, for charging a battery (not shown), and intake manifold 11, for distributing air drawn through an air cleaner to the engine cylinder intake ports. Battery powered starter 47 is used to start an engine which is not running.

Rotation of pulley 6 provides mechanical rotary drive motive power to ISM 100 when the engine is running. (Of course, the engine only rotates normally in one direction.) Pulley 6 is mounted on the end of shaft 16 by bearings 37H and is fixed concentrically to driver 22 which is part of overrunning clutch 15 which clutch is contained within the bore of pulley 6, as illustrated. See FIG. 4. The driven part 17 of clutch 15, which comprises a rotor and plurality of spring-biased cams (rollers), as shown in FIG. 4A, is fastened to shaft 16. When the engine is running and belt 8 is moving, power is delivered through pulley 6 and clutch 15 to main shaft 16, and thereby to the pumps 35, 38. When the engine is not running, over-running clutch 15 allows main shaft 16 to be rotated by motor 20 in the same direction as the shaft is rotated by the engine at a speed which is higher than the speed of the pulley 6. These aspects are further detailed below.

Figure 5:
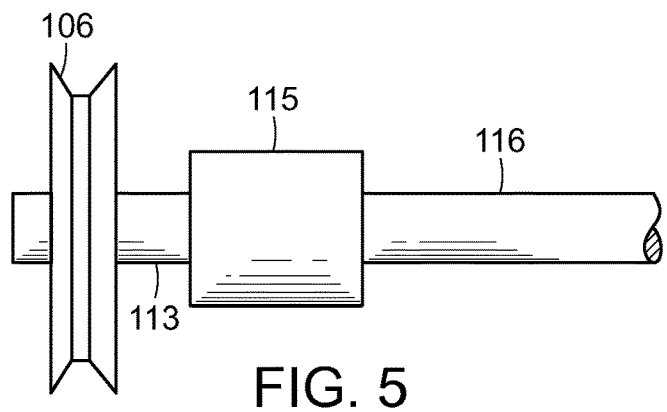
FIG. 5 is a side elevation view of the pulley and overrunning clutch portion of an alternative ISM subsystem shaft assembly.

With reference to FIG. 5, in an alternative embodiment, an overrunning clutch 115 (shown simplistically) is mounted in-line with a stub shaft 113 that is an extension of the main shaft 116 of the motor (and thus the stub shaft can be considered part of the main shaft for purposes of the claims). Pulley 106 is mounted on the stub shaft. The artisan will understand that there will be additional bearings and housing structure to support the stub shaft 113, unless the overrunning clutch 115 structure is capable of resisting the side-thrust loads imposed by the belt 8. In another alternative embodiment, not shown, the rotary input to the main shaft of the ISM subsystem from the engine is provided by a rotary output shaft of the engine rather than by a belt. In such embodiment, an in-line coupling or other coupling, including such as a right-angle bevel gear drive, replaces pulley 6 at the end of the main shaft 16.

An overrunning clutch like clutch 15 of the embodiment in FIG. 4 is preferred because it is mechanical, reliable, and does not require an input signal or energy to function. The preferred clutch of the present invention compares to a magnetic or electrically engageable/disengageable clutch that might be used in an alternative embodiment of the invention, albeit such kinds of clutch require an electrical control system.

With concentration on FIG. 4, components of the ISM 100 comprise electric motor 20, hydraulic pump 35 and vacuum pump 38. Motor 20 has an armature 21, pump 35 has an impeller 33, and pump 38 has an impeller 31, all of which are mounted concentrically on, and fixed to, main shaft 16. ISM housing 27 holds electric motor stator (which can consist of magnets or windings) 23, and holds the outer races of bearings 37 which support shaft 16. Preferably, the housings of the pumps 35, 38 are secured to housing 27 by draw bolts 24; the pumps may be otherwise attached to or integrated with housing 27. Housing 27 accepts attachment of brackets and fittings (not shown), by which the ISM subsystem may be mounted on the engine or on some other vehicle component in close proximity to the engine.

When the vehicle engine is running, clutch 15 rotates shaft 16, and thus rotates the impellers 31, 35 of pumps 35, 38, using energy from the engine that is delivered by means of belt 8 and pulley 6. When the motor vehicle is in rest mode, the engine may be not rotating at all, in which case the motion of belt 8 ceases and, in absence of power from motor 20, the main shaft 16 will stop rotating and the impellers of pumps 35, 38 provide no output. Nor will there be any vacuum in the intake manifold. Alternatively, in another mode of fuel saving, the speed of the engine (and thus the speed of belt 8 and pulley 6) is reduced to a sub-idle level which is insufficient to produce vacuum level or hydraulic pressure that enables the booster 60 of the brake system or the actuator 40 of the steering system to function adequately. In either instance, to provide for safe vehicle operation, within the present invention, hydraulic system pressure and the vacuum system sub-atmospheric pressure are maintained because motor 20 is energized to drive hydraulic pump 35 and vacuum pump 38, using electrical energy from the vehicle's existing primary battery 25 as power supply. Over-running clutch 15 allows the motor to so run, even though the motion of pulley 6 has either been stopped or has been retarded by its engagement with the now-stationary or now-slow moving belt 8. Stated another way, the over-running clutch allows the main shaft to rotate in said normal one direction at a speed which is higher than the speed of pulley 6 and without imparting rotational force to the pulley. Motor 20 may be energized manually or automatically.

In an alternate embodiment of the invention, one or both of hydraulic/vacuum pumps that are similar to pumps 35, 38 may be driven indirectly by shaft 16 rather than by having their impellers mounted on the shaft, as shown in FIG. 4. For example, the pump impellers may be gear or belt driven by the shaft 16. See also, the discussion about FIGS. 6A and 6B, below. In another alternative, each of such similar pumps may be driven by its own separate electric motor and shaft, rather by than using a single motor and common shaft.

In normal use, in the present invention, operation of the motor 20 is intermittent and in most cases the motor may be a fractional horsepower motor. Therefore, the energy required for typical motor 20 will be within the capacity of the type and size of electric storage battery, such as a lead-acid type of battery that is a familiar electric power storage/supply associated with a commercial internal combustion powered wheeled motor vehicle. Compare, if motor 20 ran continuously instead of sharing duty with the energy provided by means of engine driven belt 8: The demand on the power supply would be much greater. Alternative power supplies may be used for the electric motor 20. For example, a secondary battery, not shown, may be used to power motor 20, instead of relying entirely on the vehicle's primary battery 25. Or, a large capacitor may be used for the same purposes as the secondary battery.

In a preferred embodiment of the invention, hydraulic pump 35 having impeller 31 (shown in FIG. 4B) is used as a component in a vehicle's power-assisted steering system—that is, in substitution of a familiar power steering pump associated with commercial motor vehicles. As illustrated by FIG. 1 and FIG. 3, components of a power steering system include an actuator 40 (also called in part or whole a rack, a steering box, or a steering gear), that under hydraulic pressure moves arms, rods and/or links that are connected to wheel assemblies, for rotating the vehicle wheels about a substantially vertical axis. A reservoir stores hydraulic fluid (which reservoir may be integral with the housing portion of the pump 35); and, there are connecting hydraulic lines 48. Thus, the engine provides power to the main shaft of the ISM and thereby to hydraulic pump 35 when the engine is running; and, the ISM subsystem motor 20 provides power to hydraulic pump 35 when the engine is in rest mode.

In a preferred embodiment of the invention, motor 20 also rotates impeller 33 (illustrated in FIG. 4C) of mechanical vacuum pump 38, to create in the vacuum lines and the brake actuator a sub-atmospheric pressure (loosely called vacuum, in the field), when the engine is in rest mode. The braking system comprises the common components illustrated in FIG. 1 or FIG. 3, which include a hydraulic master cylinder 67, the piston of which is mechanically moved when brake pedal 50 is pressed. That movement pressurizes fluid in brake line 77 and the fluid pressure is conveyed to brake assemblies (such as slave cylinders, pads, disks or drums, etc.), not illustrated, at the vehicle wheels. The operator's foot-force on the brake pedal is augmented by booster 60. A typical booster 60 comprises a sealed housing containing a diaphragm (not shown) which moves when subjected to vacuum. The diaphragm applies linear force to the unshown piston of hydraulic cylinder 67 in augmentation of the foot pedal force. The combination of cylinder 67 and booster 60 is referred to herein as the brake actuator 65. Thus, when running, the engine intake manifold 11 provides the source of vacuum for the brake actuator, in particular for the brake booster, by means of line (tubing) 75 connecting the booster to the engine intake manifold, sometimes aided by an inline vacuum pump, not shown. When the engine is not running, the ISM subsystem 100 provides vacuum for the brake actuator 65 by means of vacuum pump 38, and unwanted air back-flow from the engine manifold is prevented by check valve 55. Thus power-assisted braking is accomplished regardless of engine speed.

In embodiments of the invention, the hydraulic and vacuum pumps of the ISM may be configured to provide fluid pressure and flow for purposes/devices other than power-augmentation of steering and brakes.

In the embodiment of FIG. 4, as described, the impellers of the pumps 35, 38 are rotated by the shaft 16 of motor 20 by being mounted on the shaft. In modifications of ISM 100, other types of pumps 35, 38 may be employed. For example, the hydraulic pump may be a gear pump, with the input shaft gear mounted on shaft 16 similarly to impeller 31; or the input shaft gear may be powered by such as a crank referred to in the discussion about FIG. 6A, 6B, just below.

Figure 6A:
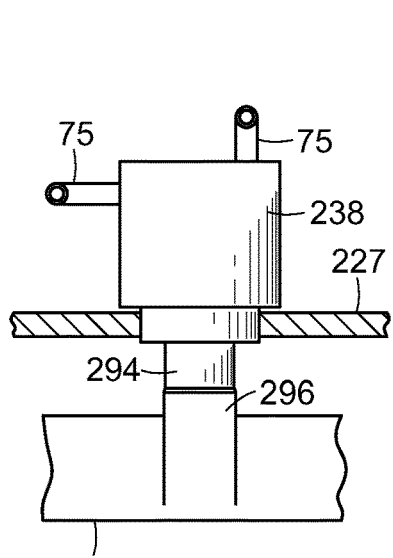
FIG. 6A is a side elevation view of an alternate embodiment ISM shaft and hydraulic pump.
Figure 6B:
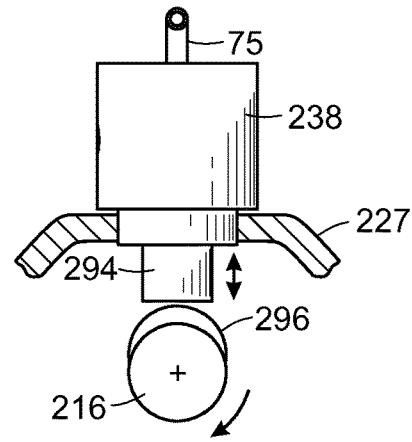
FIG. 6B is an end view of the apparatus of FIG. 6A.
Figure 6C:
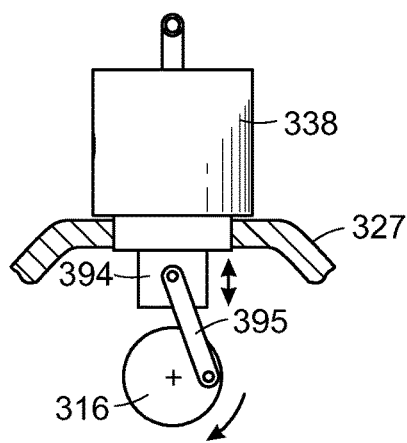
FIG. 6C is an end view like FIG. 6B, showing a further embodiment of ISM shaft and pump.

In another embodiment of the invention, one or both pumps may be mounted on the housing 27 of the ISM, and there is a connection between the pump and shaft 16 so that rotation of shaft 16 induces pumping action. In an example of this, either pump may be of the kind which has a piston (or a substitutional diaphragm in the case of the vacuum pump) that is coupled to a cam or crank that is actuated by the main shaft of the ISM. FIG. 6A is a partial side elevation view and FIG. 6B is an end view of a portion of shaft 216 and a pump 238 of an alternative ISM embodiment. Hydraulic pump 238 has an internal piston and associated input and output hydraulic lines 48 with appropriate check valves. A fragment of supporting structure 227 of the pump 238 is illustrated; the pump structure is fixed relative to the housing of the ISM and the axis of rotation of the shaft 216. A piston (not shown) within the pump is driven by a reciprocating cam follower 294 which rides on cam 296 of shaft 216. The reciprocating and rotary motions are shown by arrows in FIG. 6B. For either or both vacuum pump and hydraulic pump, a connecting rod may run between the piston (or substitutional diaphragm for a vacuum pump) and an eccentric portion of a modified shaft so that the same reciprocating action of the piston/diaphragm is realized as the cam 296 achieves. FIG. 6C is an end view of a portion of such apparatus. Pump 338 is mounted on housing 327 and the shaft 394 of the pump is pin-connected to crank shaft 316 by connecting link 395.

Figure 7:
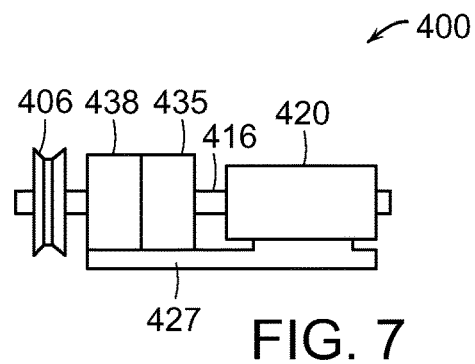
FIG. 7 is a semi-schematic side elevation view of another embodiment of ISM

FIG. 7 shows another embodiment 400 of ISM in semi-schematic side elevation view. The Figure shows that the pumps and motor may be located differently with respect to each other, within the present invention. Hydraulic pump 435 and vacuum pump 438 are located adjacent pulley 406 (within which is an over-running clutch, not visible) and the motor 420 is spaced apart along the main shaft 416 of the apparatus. The pumps and motor are mounted on housing 427, which might also be styled as a base plate. It will be understood that a reference in the claims to a housing of the motor will comprehend any structure which is fixed to the motor or pumps to hold them in position relative to one another as an ISM, and or to mount them on an engine as an integrated assembly. There may be still other configurations of apparatus within the invention. For instance, the motor may be adjacent the pulley, and/or there may be only one pump.

When compressed air is provided by the ISM, the air pump (compressor) may be of the rotary vane type and the impeller thereof may be mounted on driven by the main shaft 16 in the same way as has been described for the impeller of the hydraulic pump 35. Alternately, the air pump may be a piston or diaphragm pump, mounted with respect to the motor in accord with the FIGS. 6A, 6B and 6C description.

In embodiments of the invention, there are means for controlling the operation of the ISM subsystem in combination with means for controlling the engine operation. In one embodiment, those means comprises the operator of the vehicle who senses the speed of the vehicle from a speedometer reading or other visual or aural clues that indicate that the engine may be shut off for fuel saving purposes. In response to such observation, the operator manually activates one or more switches like switch 85 and/or takes physical steps which (a) stop the engine, as by shutting off power in the electric ignition system or by closing a fuel flow valve (b) disengage the transmission/drivetrain, and (c) energize motor 20 by connecting the motor to supply of electrical power from battery 25 or other source. Optionally, the operator disengages the engine from the drive train by physically depressing a clutch pedal or putting the transmission in neutral. Optionally, the drive train comprises an overrunning clutch that avoids having a turned off engine retard the free motion of the wheels, thereby achieving the same effect as disengaging.

Switch 85 and any other switch referred to herein may comprise a mechanical switch. The term switch shall comprehend any means for connecting and disconnecting the power supply from the motor, including such as relay and solid state devices.

Alternatively, with reference to FIG. 2, the means for controlling may comprise a controller 79 that comprises an electronic micro-processor 81 or substitutional data processor which receives signals from one or both sensors 83, 88, which sensors may be of the familiar optical or magnetic type. Sensor 83 reads directly or indirectly the speed of the vehicle, as by reading the speed of rotation of a drivetrain part or of the vehicle wheels. A representative sensor 88 reads directly or indirectly the speed of the engine, as by reading the rotational speed of input shaft at the transmission 71, or the speed of a transmission part, or the speed of pulley 7, or the speed of belt 8 or pulley 6. For example, FIG. 4 shows how a sensor 88A may be mounted on the housing 27 of the ISM 100, to optically "look at" a spot on the side of pulley 6 and therefore to signal its speed. Alternatively or in addition, a sensor 88 reads the power transmitted by the drivetrain, in which case the sensor comprises a load cell type transducer. Thus, when a predetermined low wheel speed is reached, or a low or no "power-transmitted" condition in the drivetrain is reached, the controller 79 will command the just-described switching actions (a), (b) and (c), to stop and disengage the engine and to start motor 20.

The invention may include an automatic function that is embedded in the software of the controller/processor 79/81 which determines how the controller controls the operation of a motor vehicle having an ISM subsystem 100, as follows: At a predetermined high speed, the controller automatically causes the engine to stop, and/or causes the transmission to disengage or otherwise stop transmitting power. For example, the controller may cause a clutch/coupling attached to or within the transmission to disengage. That action and the engine being stopped means the motor vehicle is in rest mode. The vehicle will then coast without consuming significant amounts of fuel compared to normal continued operation of the engine. Depending on the slope of the surface on which the vehicle is moving, the vehicle quickly or ultimately starts to decelerate. When a predetermined extent of speed decrease has taken place, the controller causes the engine to re-start (as by activating the familiar engine starter) and causes the transmission to re-engage, as applies. That is, the controller causes the vehicle to exit the rest mode when the vehicle reaches a predetermined minimum speed. At the same time, the controller will cease providing energy to motor 20.

This is a more specific example of the foregoing process: The vehicle accelerates to 55 mph at which speed it enters rest mode. The vehicle commences to coast and decelerate, and hydraulic pressure and vacuum are provided by the ISM. When the vehicle speed decreases to pre-determined minimum speed of 51 mph, the controller causes the engine to restart and causes the transmission to re-engage and transmit engine power to the wheels; the controller at the same time shuts off power to the ISM motor. The controller causes the vehicle to accelerate to a pre-determined maximum speed of 55 mph, at which point the cycle of coasting, decelerating and then accelerating may begin again. The limits at which speed changes are implemented can be adjusted to suit an operator's preferences.

The controller may receive speed signals mechanically or electronically either from dedicated sensors or from the vehicle's original equipment sensors. In an alternative embodiment, the speed of the vehicle is acquired by the controller from an outside source, such as GPS-derived location system.

In substitution of the controller, the operator may do one or more of the steps manually. For example, the operator may sense the speed of the vehicle, and manually stop the engine by turning off the ignition system; disengage the transmission; manually operate switch 85 to start motor 20; and, by continuing sensing of the vehicle speed, then manually restart the engine by activating the starter, then re-engaging the transmission.

In a preferred embodiment these functions may be controlled by the operator's manipulation of a single button or lever.

In carrying out the invention on a vehicle fitted with a manual transmission, controller 79 may be configured to disengage a typical mechanically-actuated or hydraulically-actuated clutch. For example, a servo motor, pneumatic actuator, or hydraulic actuator may be connected to the clutch activating mechanism (such as a cable, lever or push rod) so the motor/actuator acts in a way similar to the typical clutch foot-pedal. In carrying out the invention on a vehicle fitted with an automatic transmission, a controller 79 may use means which are integral in the transmission for obtaining signals about speed and power being transmitted, and for stopping the transfer of power from the engine to the rest of the drivetrain.

An example of manual control of the invention by an operator, in an embodiment which lacks the automatic controller 79, is as follows:

1. The vehicle is running normally, i.e., the engine is moving it across a surface under the control of the vehicle operator.

2. To enter rest mode, the operator disengages engine 200 from drivetrain 300, for example by depressing a clutch or putting transmission 71 in neutral, and the vehicle coasts.

3. The operator turns manual switch 85 off; as a result of which
  a. engine 200 turns off; as a result of which
    i. Rotation of drive part 22 of overrunning clutch 15 previously driven by the V-belt pulley 6 comes to a stop or is reduced; and,
    ii. shaft 16 is no longer driven by pulley 6 (engine 200), acting through over-running clutch 15.
  b. Vehicle battery 25 is connected to electric motor 20, as a result of which
    i. shaft 16 of motor 20 rotates and powers hydraulic pump 35, which provides power-augmentation to power steering actuator 40, and
    ii. shaft 16 of motor 20 rotates and powers mechanical vacuum pump 35, which applies vacuum to brake booster 60; and,
    iii. when present, an air compressor driven by motor shaft 16 provides compressed air to components on the motor vehicle.

4. When the operator decides that rest mode should cease, the operator
  a. turns off manual switch 85, as a result of which
    i. motor 20 is de-energized, and
  b. restarts the engine.

5. Engine 200 again becomes the mechanical power source that rotates shaft 16, to power hydraulic pump 35, vacuum pump 38 and any other equipment that is powered by shaft 16 of motor 20.

6. Steps 3, 4 and 5 are repeated one or more times, or the operator continues operating the vehicle without again entering rest mode.

It will be understood that when the controller 79 is part of the system, the controller will carry out parts or all of the manual actions of the operator that are recited above.

Advantages of the present invention include enhanced safety, enhanced fuel economy, adaptability to vehicles with internal combustion engines, and capability of being installed either as original equipment in new vehicles or as an after-market product not necessitating in many cases disassembly of the drive train from the engine. The present invention will be useful for various kinds of motor vehicles, including trucks.

The invention, with explicit and implicit variations and advantages, has been described and illustrated with respect to several embodiments. Those embodiments should be considered illustrative and not restrictive. Any use of words such as "preferred" and variations suggest a feature or combination which is desirable but which is not mandatory. Thus embodiments lacking any such preferred feature or combination may be within the scope of the claims which follow. Persons skilled in the art may make various changes in form and detail of the invention embodiments which are described, without departing from the spirit and scope of the claimed invention.

What is claimed is:

1. Apparatus for use on a motor vehicle comprising an internal combustion engine, a starter, a power supply, means for stopping which is either an ignition shut off switch or an engine fuel shut off valve, a transmission, drivetrain and wheels interconnected with the engine for moving the vehicle on a surface; the engine having a first pulley that is rotated directly or indirectly by the engine; the motor vehicle further comprising a hydraulic pressure-augmented steering subsystem, and a vacuum-augmented brake subsystem; which apparatus comprises:

an electric motor, configured for being mounted on or in close proximity to said engine, the electric motor comprising a rotatable main shaft, an armature mounted fixedly on the main shaft for rotating the main shaft when the electric motor is connected to said power supply, the electric motor further comprising a housing and a stator affixed to the housing;

a hydraulic pump, mounted on or integrated with said housing and driven by said main shaft, the hydraulic pump configured for connecting to said hydraulic power-augmented steering subsystem, to provide pressurized hydraulic fluid thereto;

a vacuum pump, mounted on or integrated with said housing and driven by said main shaft, the vacuum pump configured for connecting to and for drawing air from the vacuum-power augmented brake subsystem;

an over-running clutch having a drive portion and a driven portion, for rotating said main shaft in one direction only, the driven portion mounted on or connected to said main shaft;

a second pulley connected to the drive portion of the over-running clutch, configured for being rotated by said first pulley through an endless belt; and, means for connecting to and disconnecting from said power supply the electric motor as a function of whether the rotary motion speed of said drive portion is different from the contemporaneous rotary motion speed of said main shaft, the means comprising either a manual switch operated by a motor vehicle operator or a controller having a processor in combination with one or more sensors for generating signals to the processor responsive to either or both the speed of rotation of said drive portion or the speed of rotation of one or more rotatable parts of said engine or of said transmission, or to the amount of motive power being transmitted by said drivetrain to the wheels;

wherein said apparatus is configured for being mounted on said motor vehicle so that said endless belt that is driven by said first pulley drives said drive portion in said one direction;

wherein the over-running clutch enables the drive portion to rotate the main shaft in said one direction only, when the drive portion is rotated by means of the pulley and endless belt; and, wherein the over-running clutch enables the electric motor to rotate the main shaft in said one direction at a speed which is higher than the contemporaneous speed of the drive portion of the over-running clutch.

2. The apparatus of claim 1 wherein the hydraulic pump and vacuum pump each comprise an impeller or other rotary part, wherein each impeller or other rotary part is mounted concentrically on said main shaft.

3. The apparatus of claim 2 wherein the hydraulic pump and the vacuum pump and the electric motor armature are mounted on the main shaft, with said armature located in between said pumps.

4. The apparatus of claim 1 wherein at least one of the hydraulic pump and the vacuum pump is fixedly mounted with respect to said housing and is driven by a cam or link actuated by rotary motion of said main shaft.

5. The apparatus of claim 1, wherein said motor vehicle includes a compressed air subsystem, further comprising an air pump, mounted on or integrated with said housing and driven by said main shaft, the air pump configured for connecting to said compressed air subsystem.

6. The apparatus of claim 1 in combination with a said motor vehicle having said electric power supply, the apparatus mounted on a part of the motor vehicle so that said endless belt rotates said drive portion of the apparatus in said one direction; wherein the hydraulic pump and vacuum pump are connected respectively to said hydraulic pressure-augmented steering subsystem and said vacuum-augmented brake subsystem; and wherein the electric motor is selectively connectable to the power supply.

7. The combination of claim 6, wherein said means for connecting to and disconnecting from said power supply the electric motor comprises a controller having a processor, further comprising said one or more sensors for generating signals to the processor as a function of the rotary speed of one or more parts of the motor vehicle.

8. A motor vehicle comprising an internal combustion engine having a rotary output shaft, a starter, and means for stopping which is either an electric shut-off switch or an engine fuel shut off valve, a drivetrain, an engine having a rotary output shaft, a transmission, and wheels, all the foregoing interconnected for moving the vehicle on a surface; the vehicle further comprising:

an endless belt driven by a first pulley that is rotated directly or indirectly by said engine;

a hydraulic pressure-augmented steering subsystem;

a vacuum-augmented brake subsystem;

an electric motor, mounted on or in close proximity to said engine, the electric motor comprising a rotatable main shaft and an armature mounted fixedly on the main shaft for rotating the main shaft when the electric motor is connected to a power supply, the electric motor having a housing;

a hydraulic pump, mounted on or integrated with said housing and driven by said main shaft, the hydraulic pump connected to said hydraulic power-augmented steering subsystem, to provide pressurized hydraulic fluid thereto;

a vacuum pump, mounted on or integrated with said housing and driven by said main shaft, the vacuum pump connected to the vacuum-power augmented brake subsystem, to draw sub-atmospheric air therefrom;

an over-running clutch having a drive portion and a driven portion, the driven portion mounted on or connected to said main shaft;

a second pulley connected to the drive portion of the over-running clutch, for rotating said main shaft in one direction only, the second pulley engaged with said endless belt for rotary motion thereof;

a power supply for powering the electric motor; and, means for connecting to and disconnecting from the electric motor the power supply as a function of whether the rotary motion speed of the second pulley is different from the contemporaneous speed of said main shaft, the means comprising either a manual switch operated by a motor vehicle operator, or a controller having a processor in combination with one or more sensors for generating signals to the processor responsive to either or both the speed of rotation of said second pulley or the speed of rotation of one or more rotatable parts of said engine or of said transmission, including said rotary output shaft, or responsive to the amount of motive power being transmitted by said drivetrain to the wheels;

and, wherein the over-running clutch enables the drive portion thereof, responsive to the endless belt driving said second pulley thereby to rotate the main shaft in one direction only, and enables the electric motor to rotate the main shaft in said one direction at a speed which is higher than the contemporaneous speed of the second pulley.

9. The motor vehicle of claim 8 wherein the hydraulic pump and vacuum pump each comprise an impeller or other rotary part, wherein each impeller or other rotary part is mounted concentrically on said main shaft.

10. The motor vehicle of claim 8 wherein at least one of the hydraulic pump and the vacuum pump is fixedly mounted with respect to said housing and is driven by a cam or link actuated by rotary motion of said shaft.

11. The motor vehicle of claim 8, wherein said motor vehicle includes a compressed air subsystem, further comprising an air pump, mounted on or integrated with said housing and driven by said main shaft, the air pump connected to said compressed air subsystem.

\* \* \* \* \*